(12) United States Patent
Gay

(10) Patent No.: X9117
(45) Date of Patent: Sep. 26, 1835

(54) LOOM, POWER, FOR SILKS

(76) Inventor: Gamaliel Gay

Gamaliel Gay, Poughkeepsie Dutchess Co. N.Y.

The Schedule referred to in these Letters Patent and making part of the same, containing a description in the words of the said Gamaliel Gay himself of his improvement in the manufacturing of Silks in the Power Loom.

---

To all to whom these presents shall come, I Gamaliel Gay of the Town of Poughkeepsie in the County of Dutchess and State of New York. Send Greeting. Be it known that I Gamaliel Gay Have invented and applied to use a new and useful improvement and method in the manufacture of Silk Goods and Cloths, i.e., in the weaving of Silk. Silk cloths have heretofore at all times and in all nations been wove by hand and on hand Looms. And in no instance has the loom for weaving of silk been worked or its machinery propelled by water or steam power or other than by hand, as formerly were all fabrics wove. Laterally however cotton and certain other cloths have been wove in Looms propelled or operated by mechanical power in looms called and universally known as the "power Loom". This Loom has not hitherto been applied to the weaving of silk, that having hitherto been wove as before stated by and with hand looms only. Looms operated by manual labour.

The Improvement in the manufacture of silk cloth of which I claim to be the Original inventor or discoverer and for which I claim Letters Patent is the application of the power Loom to the weaving of silk I have adapted and applied the Power Loom to actual use in the weaving of Silk. In this application and adaptation of the Power Loom, I have made and claim no material alteration in principle of the Power Loom and make no claim to any alteration or improvement of or upon it. What I claim is a new and useful improvement in the weaving of Silk, by substituting the Power Loom to the hand Loom and applying and adapting and using the Power Loom in the weaving of Silk cloth. This is a new improvement in the manufacture of Silk cloth, it never having been so used until by me adopted and applied to that use. It is useful because it greatly facilitates the operation of silk weaving and reduces the expense thereof. It is not deemed necessary to give a detailed description of the Power Loom as it is when applied to the weaving of Silk substantially the same in form and principle as the power Loom commonly used in the manufacture of Cotton cloths, and operate substantially upon the same principles and in the same way.

Dated September 9th. 1835.

Signed in presence of
W. H. Barnard and
Daniel Hebard

Gamaliel Gay.

((500 words)) Patented 26th Sept. 1835.

[illegible]

Drawing not required